United States Patent
Kim et al.

(10) Patent No.: US 8,228,793 B2
(45) Date of Patent: Jul. 24, 2012

(54) METHOD FOR ADAPTIVE DELAY THRESHOLD-BASED PRIORITY QUEUEING SCHEME FOR PACKET SCHEDULING IN MOBILE BROADBAND WIRELESS ACCESS SYSTEM

(75) Inventors: Jaehoon Kim, Seongnam-si (KR); Seunghoi Kim, Seongnam-si (KR); Chankoo Kang, Seongnam-si (KR); Chunggu Kang, Seoul (KR); Jinmo Ku, Seoul (KR); Sungkyung Kim, Seoul (KR)

(73) Assignee: SK Telecom Co., Ltd. (KR)

( * ) Notice: Subject to any disclaimer, the term of this patent is extended or adjusted under 35 U.S.C. 154(b) by 1018 days.

(21) Appl. No.: 12/093,909

(22) PCT Filed: Nov. 20, 2006

(86) PCT No.: PCT/KR2006/004884
§ 371 (c)(1),
(2), (4) Date: May 15, 2008

(87) PCT Pub. No.: WO2007/058508
PCT Pub. Date: May 24, 2007

(65) Prior Publication Data
US 2008/0247357 A1 Oct. 9, 2008

(30) Foreign Application Priority Data
Nov. 18, 2005 (KR) .................. 10-2005-0110981

(51) Int. Cl.
*H04J 3/16* (2006.01)
(52) U.S. Cl. .................. 370/230; 370/412; 370/437
(58) Field of Classification Search .......... 370/229, 370/230, 232, 328, 329, 338, 412, 431, 437, 370/465
See application file for complete search history.

(56) References Cited

U.S. PATENT DOCUMENTS
2003/0198204 A1* 10/2003 Taneja et al. ............. 370/332
* cited by examiner

*Primary Examiner* — Nittaya Juntima
*Assistant Examiner* — Mon Cheri Davenport
(74) *Attorney, Agent, or Firm* — Baker & Hostetler LLP (57) ABSTRACT

Disclosed is a method for adaptive delay threshold-based priority queueing for packet scheduling in a mobile broadband wireless access system, which corresponds to a resource allocation method capable of satisfying Quality of Service (QoS) requested by realtime and non-realtime users in a mobile communication environment, and simultaneously maximizing the capacity of the mobile broadband wireless access system.

9 Claims, 6 Drawing Sheets

METHOD FOR ADAPTIVE DELAY THRESHOLD-BASED PRIORITY QUEUEING SCHEME FOR PACKET SCHEDULING IN MOBILE BROADBAND WIRELESS ACCESS SYSTEM

CROSS-REFERENCE TO RELATED APPLICATION

This non-provisional application claims priority under 35 U.S.C §119(a) on Patent Application No. 10-2005-0110981 filed in Korea on Nov. 18, 2006 respectively, the entire contents of which are hereby incorporated by reference.

TECHNICAL FIELD

The present invention relates to a method for adaptive delay threshold-based priority queueing for packet scheduling in a mobile broadband wireless access system. More particularly, the present invention relates to a method for adaptive delay threshold-based priority queueing for packet scheduling in a mobile broadband wireless access system, which corresponds to a resource allocation method capable of satisfying Quality of Service (QoS) requested by realtime and non-realtime users in a mobile communication environment, and simultaneously maximizing the capacity of the mobile broadband wireless access system.

BACKGROUND ART

Since current wired communication and mobile phone markets have matured, there are limitations in pursuing the development of communication industries through simple subscriber increase based on an existing service. On account of this, a portable Internet system has emerged as a new breakthrough of communication industries, which can not only use a 2.3 GHz band, but can also use an Internet service in stationary environments and mobile environments involving movement at various speeds by integrating mobile communication environments with wired communication environments. Hereinafter, technical backgrounds in which a portable Internet system has emerged will be briefly described.

A mobile communication system has developed from a first generation analog Advanced Mobile Phone System (AMPS) scheme, and a second generation cellular/portable communication service scheme, and has recently emerged into an International Mobile Telecommunication-2000 (IMT-2000) corresponding to a third generation high speed data communication. An IMT-2000 service may be classified as a Code Division Multiple Access (CDMA) 2000 1X service or a CDMA 2000 1X EV-DO service. A CDMA 2000 1X service denotes a service capable of providing a wireless Internet service at a maximum speed of 144 Kbps far faster than that of 14.4 Kbps or 56 Kbps, which is supported by an existing IS-95A or IS-95B network, by using an IS-95C network evolved from the IS-95A or IS-95B network. Accordingly, it becomes possible to not only improve the quality of existing voice and Wireless Application Protocol (WAP) services, but also to provide various multimedia services including an Audio On Demand (AOD), a Video On Demand (VOD), etc.

However, since a mobile communication system providing an existing wireless Internet service requires high base station installation costs, service charge for the wireless Internet service is high. Further, since a mobile communication terminal has a small screen size, usable contents are limited. Therefore, it is limited to provide an Internet service equal to that provided in wired Internet environments. Furthermore, in the case of using Wireless Local Area Network (WLAN) technology in a wireless Internet service, it is limited to smoothly provide the wireless Internet service due to radio wave interference, narrow coverage, the impossibility of service use in movement, etc. On account of this, a portable Internet system or a Wireless Broadband Internet (WBI) system has emerged, which can wirelessly use an Internet service at a low cost while in motion, which is equal to that provided in wired Internet environments. That is, a portable Internet system denotes a system which is located between a WLAN system and a wireless Internet system based on mobile communication, accesses the Internet in stationary environments and mobile environments involving movement at various speeds regardless of time and places by using a PDA, a notebook and various types of portable wireless terminals, and then provides a wireless Internet service capable of using various pieces of information and contents.

In a conventional portable Internet system, in other words, a mobile access system, research into a resource allocation method of the mobile access system has been actively conducted in order to satisfy QoS and to support various types of supplementary services. A representative resource allocation method of a mobile access system includes a Delay Threshold-based Priority Queueing (DTPQ) scheduling scheme. A DTPQ scheduling scheme denotes algorithm for setting a maximum delay threshold value in a realtime service and then scheduling processes required for a mobile access system in order to satisfy QoS requested by realtime and non-realtime service users, and to increase the capacity of the mobile access system.

A conventional DTPQ scheduling scheme used as algorithm for scheduling processes of a mobile access system has the following problems. That is, in the conventional DTPQ scheduling scheme, since only packet data exceeding a delay threshold value having the preset delay time of a Head of Line (HOL) is scheduled from among packet data provided in a realtime service, the mobile access system may be overloaded in a process of providing the realtime service. In short, in the DTPQ scheduling scheme, an optimal delay threshold value must be differently set in various service environments, i.e. since the number of realtime users and the number of non-realtime users change in the mobile access system, the delay threshold value must also change in consideration of this. However, since the optimal delay threshold value is fixed, the mobile access system may be overloaded in a process of providing the realtime service.

DISCLOSURE OF THE INVENTION

Therefore, the present invention has been made in view of the above-mentioned problems, and it is an object of the present invention to provide a method for adaptive delay threshold-based priority queueing for packet scheduling in a mobile broadband wireless access system, which corresponds to a resource allocation method capable of satisfying Quality of Service (QoS) requested by realtime and non-realtime users in a mobile communication environment, and simultaneously maximizing the capacity of the mobile broadband wireless access system.

According to one aspect of the present invention, there is provided a method for Adaptive Delay Threshold-based Priority Queueing (A-DTPQ) scheduling by which a packet data scheduler allocates wireless resources, the packet data scheduler being included in a mobile broadband wireless access system integrally providing a realtime service and a non-realtime service, the method comprising the steps of: (a)

determining whether there exists a terminal receiving packet data in excess of a delay threshold value by analyzing packet data transmitted to a plurality of user terminals requesting use of the realtime service; (b) adaptively updating the delay threshold value when there exists the terminal receiving packet data in excess of the delay threshold value; and (c) allocating the wireless resources to the terminal according to the delay threshold value updated in step (b).

According to another aspect of the present invention, there is provided a method for forming an urgency metric and allocating wireless resources by using the urgency metric in an Adaptive Delay Threshold-based Priority Queueing (A-DTPQ) scheduling method by which a packet data scheduler allocates the wireless resources, the packet data scheduler being included in a mobile broadband wireless access system integrally providing a realtime service and a non-realtime service, the method comprising the steps of: (a) computing residual time $W_{max}-W_i^{hol}(t)$ by analyzing a Head of Line (HOL) of packet data transmitted to a plurality of user terminals requesting use of the realtime service; (b) computing an instantaneous data rate $r_i(t)$ by analyzing the HOL of the packet data; (C) computing a delay loss rate $z_t$ by analyzing the HOL of the packet data; and (d) computing the urgency metric by using the residual time $W_{max}-W_i^{hol}(t)$, the instantaneous data rate $r_i(t)$, and the delay loss rate $z_t$.

BRIEF DESCRIPTION OF THE DRAWINGS

The above and other objects, features and advantages of the present invention will be more apparent from the following detailed description taken in conjunction with the accompanying drawings, in which.

BEST MODE FOR CARRYING OUT THE INVENTION

Reference will now be made in detail to the preferred embodiment of the present invention. It should be noted that the similar components are designated by similar reference numerals although they are illustrated in different drawings. Also, in the following description, a detailed description of known functions and configurations incorporated herein will be omitted when it may obscure the subject matter of the present invention.

Figure 1:
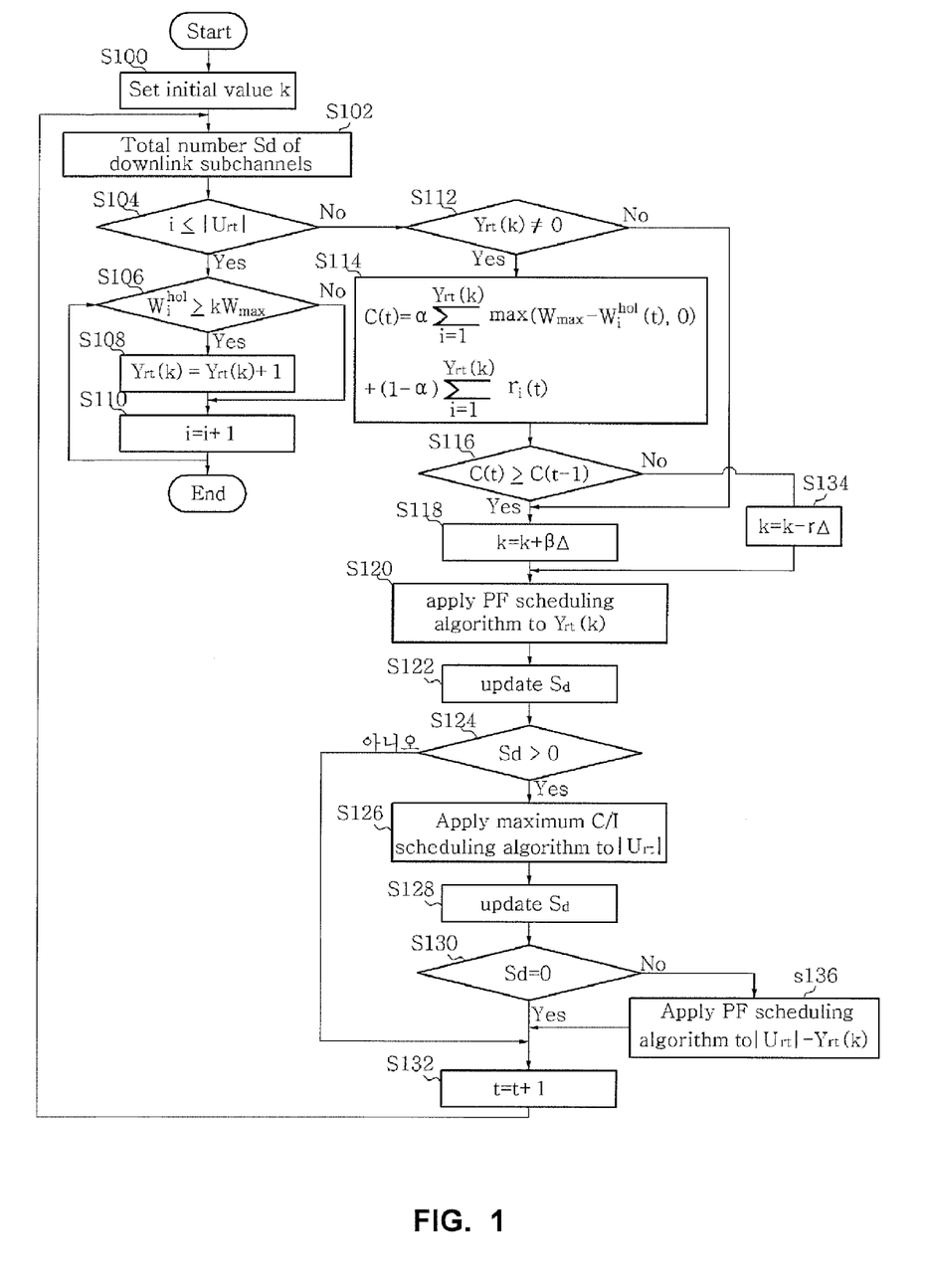
FIG. 1 is a flow diagram illustrating a process of scheduling packet data by using an Adaptive-DTPQ (A-DTPQ) scheduling scheme according to a preferred embodiment of the present invention.
Figure 2:
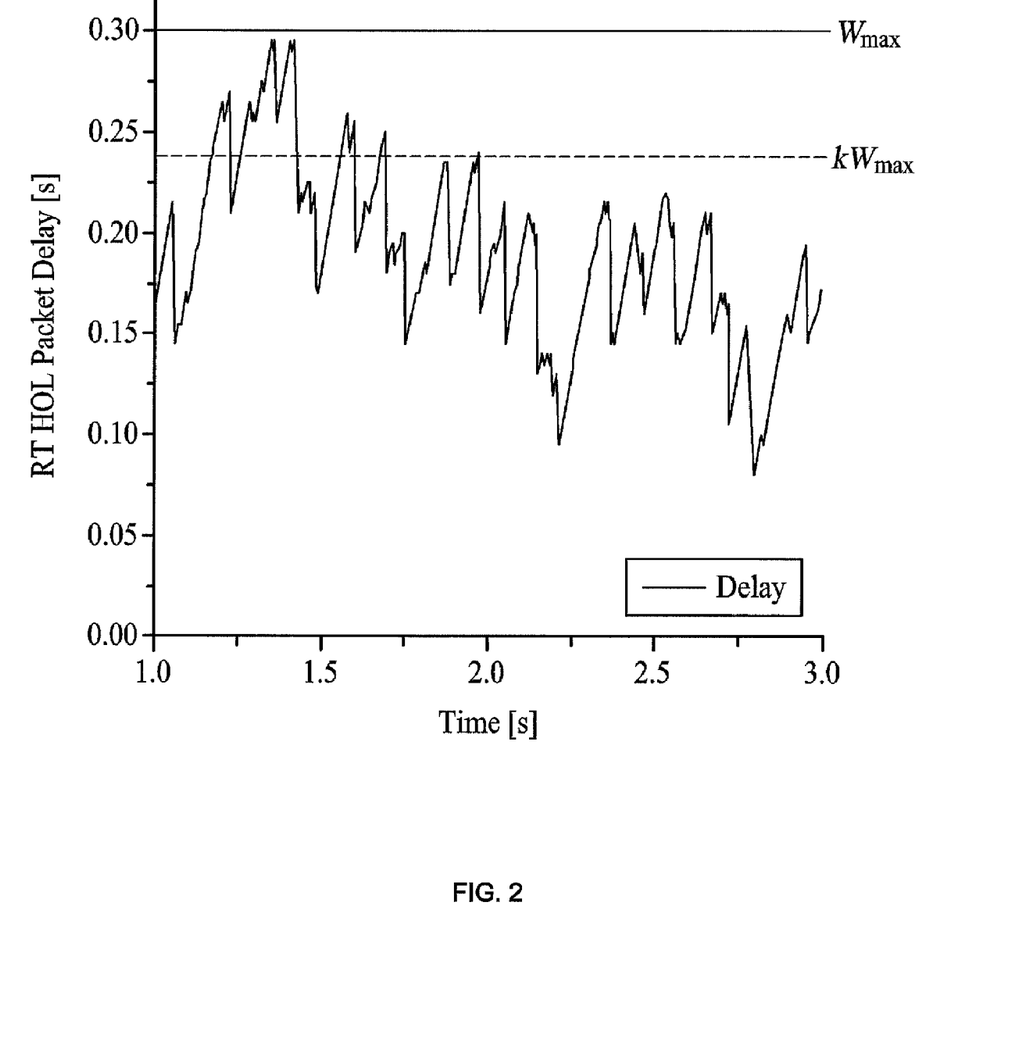
FIG. 2 is an exemplary graph illustrating the delay time of a realtime service class HOL.

FIG. 1 is a flow diagram illustrating a process of scheduling packet data by using an A-DTPQ scheduling scheme according to a preferred embodiment of the present invention, and FIG. 2 is an exemplary graph illustrating the delay time of a realtime service class HOL.

In the following description, a scheme will be referred to as an A-DTPQ scheduling scheme, which uses delay threshold values differently, set in various service environments so as to schedule packet data, in addition to the use of a DTPQ scheduling scheme.

Hereinafter, the main characteristics of the present invention will be briefly described. The present invention is characterized in that it defines the urgency metric of an urgent realtime user existing in a mobile access system, and then updates a delay threshold value according to the defined urgency metric. Further, the present invention is characterized in that it defines a system-wide average outage rate as an index for the performance of a mobile access system for Quality of Service (QoS) with respect to each service class. In addition, an A-DTPQ scheduling scheme proposed in the present invention is based on performance evaluation through system level simulation in a mobile broadband wireless access system based on Orthogonal Frequency Division Modulation/Multiplexing Access (OFDMA)/Time Division Duplex (TDD), and Tables 1 to 4 below denote indices computed based on the performance evaluation. In short, an A-DTPQ scheduling scheme described in the present invention is characterized in that it flexibly copes with service environments by changing a delay threshold value $k_t W_{max}$, which is obtained by multiplying a maximum allowable delay time $W_{max}$ required by a service by a delay threshold value control parameter $k_t$, according to frames as illustrated in FIG. 2, and allocates priorities.

Hereinafter, a process for computing various parameters, a process for computing an urgency metric by using the parameters, and a process for computing a delay threshold value of a realtime service will be described. The parameters include a packet data loss rate parameter determined by the maximum allowable delay time $W_{max}$ as QoS requirements of a realtime service class, a system-wide outage rate parameter for the realtime service class, a system-wide average outage rate parameter for the realtime service class, a data rate parameter for the realtime service class, a system-wide average outage rate parameter for the non-realtime service class, and a parameter regarding the number of urgent realtime users for a delay threshold value. The urgency metric is a function for determining whether a realtime user using a realtime service is urgent.

First, the process for computing the packet data loss rate parameter determined by the maximum allowable delay time $W_{max}$ will be described.

When the delay time of a HOL exceeds the $W_{max}$, corresponding packet data is discarded in a mobile access system, and a packet data loss rate is computed. Accordingly, as the delay time of the HOL approximates to the $W_{max}$ in the realtime service class, a higher priority must be given to a realtime service user. However, when a priority is too quickly given to a realtime service user, the QoS requirements of a realtime service class are excessively strict, which results in deterioration of a non-realtime service class. The QoS requirements of the realtime service class can be confirmed through the packet data loss rate (rate of discarded packet data with respect to all transmitted packet data) parameter. When packet data stored in the base station buffer of a mobile access system exceeds the $W_{max}$ defined by the mobile access system, corresponding packet data is discarded.

When $U_{rt}$ and $U_{nrt}$ are respectively defined as users belonging to the realtime service class and the non-realtime service class, the total number of packet data received in a realtime user i up to frame t is defined as $J_i(t)$, and the delay time of $j^{th}$ packet data from among the packet data received in the user i is defined as $W_i^j(t)$, the packet data loss rate parameter of the user i in the certain frame t is computed by Equation 1 below.

$$L_i = \frac{\sum_{j=1}^{J_i(t)} U(W_i^j(t) - W_{max})}{J_i(t)}, i \in U_{rt} \quad \text{Equation 1}$$

In Equation 1, U(x) is computed by Equation 2 below.

$$U(x) = \begin{cases} 1 & \text{for } x > 0 \\ 0 & \text{otherwise} \end{cases} \quad \text{Equation 2}$$

Then, the process for computing the system-wide average outage rate parameter of the realtime service class will be described. First, when the maximum allowable loss rate of packet data according to users is defined as $L_{max}$, the system-wide average outage rate parameter in the frame t is defined as a ratio of users exceeding the $L_{max}$ with respect to the total realtime service users as expressed by Equation 3, and is indicated by $P_{out}^{(rt)}(t)$.

$$P_{out}^{(rt)}(t) = \frac{1}{N_{rt}} \sum_{i=1}^{N_{rt}} U(L_i(t) - L_{max}) \quad \text{Equation 3}$$

In Equation 3, $N_{rt}$ denotes the number of valid realtime service users in the mobile access system, and is equal to $|U_{rt}|$.

The system-wide average outage rate parameter of the realtime service class is computed by Equation 4 below.

$$P_{out}^{\prime(rt)} = \lim_{t \to \infty} \frac{1}{t} \int_0^t P_{out}^{(rt)}(\tau) d\tau \quad \text{Equation 4}$$

A similar performance measurement scheme is used for the non-realtime service class having soft QoS requirements. The present invention considers a minimum request data rate $R_{min}$ for the non-realtime service class. Differently from hard QoS requirements considered in the realtime service, even when the soft QoS requirements do not satisfy the $R_{min}$, corresponding packet data is not discarded.

Next, the process for computing the data rate parameter of the realtime service class will be described.

If the data rate of the user i in the frame t is defined as $R_i(t)$, the current data rate of the user i and the number of subchannels may be defined as $r_i(t)$ and $S_i(t)$, respectively, because a set of subchannels is shared by users by the frame in the case of an OFDMA system. Accordingly, $R_i(t)$ is computed by Equation 5 below.

$$R_i(t) = \frac{1}{T} \sum_{t=t_0}^{t_0+T} r_i(t) \frac{S_i(t)}{S_d}, i \in U_{nrt} \quad \text{Equation 5}$$

In Equation 5, $S_d$ denotes the total number of subchannels available in a downlink frame, and T denotes the size of a time window by the frame. If an average data rate is computed based on this, $$R_i' = \lim_{T \to \infty} R_i(t)$$

is formed.

In a way similar to that in the hard QoS requirements, the soft QoS requirements may be expressed by an average outage rate. The system-wide average outage rate parameter of the non-realtime service class is computed by Equation 6 below.

$$P_{out}^{(nrt)} = \frac{1}{N_{nrt}} \sum_{i=1}^{N_{nrt}} U(R_{min} - R_i') \quad \text{Equation 6}$$

In Equation 6, $N_{nrt}$ denotes the number of valid non-realtime service users in the mobile access system, and is equal to $|U_{nrt}|$.

A delay threshold value set in a previous frame is reset in the current frame t through the delay time $W_i^{hol}(t)$ of a HOL for the user i and an instantaneous data rate $R_i(t)$. The threshold value increases or decreases depending on the residual time of realtime service packet data and current channel conditions. When average channel conditions of realtime users are bad or an outage rate is high, a threshold value must be reduced because the realtime users are more urgent as compared to non-realtime users. Urgent realtime users in the frame t are users exceeding a delay threshold value in which a HOL delay time has been established.

Hereinafter, the process for computing the parameter regarding the number of urgent realtime users for a given delay threshold value control parameter $k_t$ will be described. First, the parameter regarding the number of urgent realtime users is computed by Equation 7 below.

$$Y_{rt}(k_t) = \sum_{i \in U_{rt}} U(W_i^{hol}(t) - k_t W_{max}) \quad \text{Equation 7}$$

The delay threshold value must be determined through the urgency of realtime users. Accordingly, the process for computing the urgency metric, which is a function capable of determining whether realtime users using the mobile access system are urgent, by using the parameters obtained by Equations 1 to 7 based on the current data rate and residual time of the realtime users will be described. Such a function is computed by Equation 8 below.

$$c(t) = \alpha \sum_{i=1}^{Y_{rt}(K_t)} \max(W_{max} - W_i^{hol}(t), 0) + (1 - \alpha) \sum_{i=1}^{Y_{rt}(K_t)} r_i(t) \quad \text{Equation 8}$$

In Equation 8, α denotes a weighting factor for determining a weight between the urgency of urgent realtime users and channel conditions. In Equation 8, the second term denotes an average data rate of urgent realtime service users in the frame t. In addition, the functional meaning of Equation 8 lies in that it provides realtime users using the mobile access system with a criterion capable of determining whether urgency has been reached. For example, a case in which c(t)>c(t−1) denotes that a realtime service is not urgent. Accordingly, the delay threshold value must increase.

Equation 9 below denotes an Equation for computing the delay threshold value control parameter.

$$k_{t+1} = \begin{cases} k_t + \beta\Delta, & c(t) > c(t-1) \text{ and } Y_{rt}(k_t) = 0 \\ k_t - \gamma\Delta, & \text{otherwise} \end{cases} \quad \text{Equation 9}$$

In Equation 9, Δ denotes the increment and decrement of a delay threshold value control parameter set according to frames, and β and γ denote the weighting factor of Δ. In the present invention, it is assumed that β=5γ. An initial threshold value $k_0$ based on Equation 9 is equal to $$\frac{N_{nrt}}{N_{rt} + N_{nrt}}.$$

Herein, the urgency metric and threshold value when considering the delay loss of realtime users are updated by Equations 10 and 11.

$$c(t) = \sum_{i=1}^{Y_{rt}(K_t)} \max(W_{max} - W_i^{hol}(t), 0) \cdot r_i(t) \quad \text{Equation 10}$$

$$k_{t+1} = \begin{cases} k_t + \Delta, & c(t) > c(t-1) \text{ and } Y_{rt}(k_t) = 0 \\ k_t - \max\{0, \exp(z_t - \gamma Z_{max}) - 1\} \cdot \Delta, & \text{otherwise} \end{cases} \quad \text{Equation 11}$$

In Equation 11, $z_t$ denotes an instantaneous delay loss rate of a realtime service, $Z_{max}$ denotes a threshold delay loss rate, and γ (0<γ<1) denotes a margin for a delay loss rate.

Hereinafter, a process for scheduling packet data by using the A-DTPQ scheduling scheme illustrated in FIG. 1 based on the urgency metric computed by Equation 8 will be described.

First, in order to schedule packet data by using the A-DTPQ scheduling scheme, the delay threshold value parameter k and the total number $S_d$ of downlink subchannels are set as initial values (S100 and S102). Then, whether realtime users i exceed the total number $|U_{rt}|$ of valid users belonging to a realtime service class is determined (S104). When the number of realtime users i does not exceed the total number $|U_{rt}|$ of valid users, whether the delay time of the HOL exceeds the delay threshold value $k_t W_{max}$ for packet data used by the realtime users i is determined (S106).

When the delay time of the HOL exceeds the delay threshold value $k_t W_{max}$ in step 106, unit quantity is increased for the number $Y_{rt}(k_t)$ of urgent realtime users for the given delay threshold value control parameter $k_t$ (S108). Then, unit quantity is also increased for the realtime users i (S110). When the delay time of the HOL does not exceed the delay threshold value $k_t W_{max}$ in step 106, the unit quantity is also increased for the realtime users i in step 110.

However, when the realtime users i exceed the total number $|U_{rt}|$ of valid users in step 104, whether the number $Y_{rt}(k_t)$ of urgent realtime users is 0 for the delay threshold value control parameter $k_t$ is determined (S112). When the number $Y_{rt}(k_t)$ of urgent realtime users is not 0 in step 112, the urgency metric is obtained using the parameters computed in Equations 1 to 7 (S114), and whether a margin exists in the QoS of an urgent realtime service user is determined using the obtained urgency metric (S116).

When the realtime service is not urgent as a result of the determination in step 116, the delay threshold value control parameter is increased (S118). However, when the realtime service is urgent as a result of the determination in step 116, the delay threshold value control parameter is decreased (S134).

In the meantime, a Proportional Fairness (PF) scheduling algorithm is applied to the number $Y_{rt}(k_t)$ of urgent realtime users regardless of the determination in step 116 (S120), and the total number $S_d$ of downlink subchannels is updated (S122).

After step 122, whether the updated number $S_d$ of downlink subchannels is greater than 0 is determined (S124). When the updated number $S_d$ of downlink subchannels is greater than 0, a maximum C/I scheduling algorithm is applied to the users $|U_{rt}|$ belonging to the realtime service class (S126). However, when the updated number $S_d$ of downlink subchannels is smaller than 0, a frame is increased by unit quantity.

After step 126, the total number $S_d$ of downlink subchannels is updated again, and whether the updated number $S_d$ of downlink subchannels is 0 is determined (S130). When the updated number $S_d$ of downlink subchannels is 0 as a result of the determination in step 130, a frame is increased by unit quantity (S132). However, when the updated number $S_d$ of downlink subchannels is not 0, a difference between the users $|U_{rt}|$ belonging to the realtime service class and the number $Y_{rt}(k_t)$ of urgent realtime users for the delay threshold value control parameter $k_t$ is calculated, and the PF scheduling algorithm is applied to the calculation results (S136).

Figure 3:
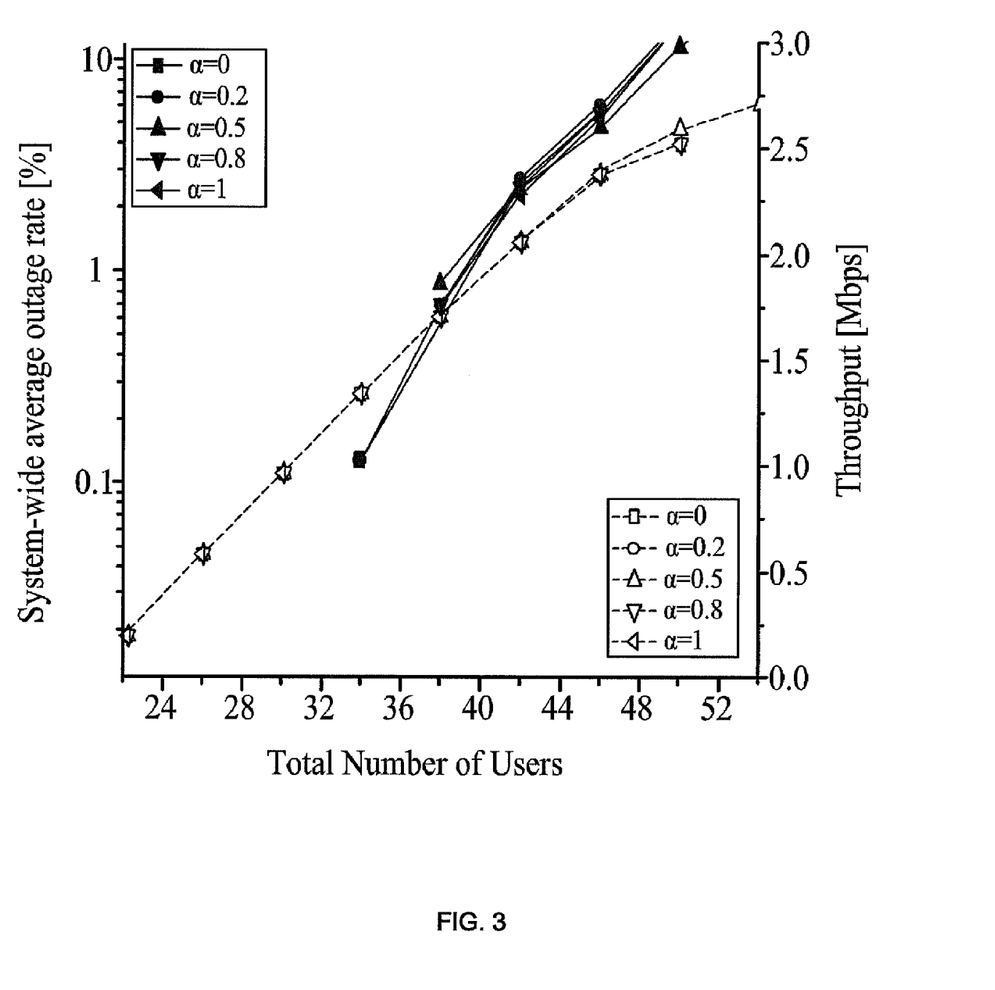
FIG. 3 is a graph illustrating a system-wide average outage rate based on a in an urgency metric according to a preferred embodiment of the present invention.
Figure 4:
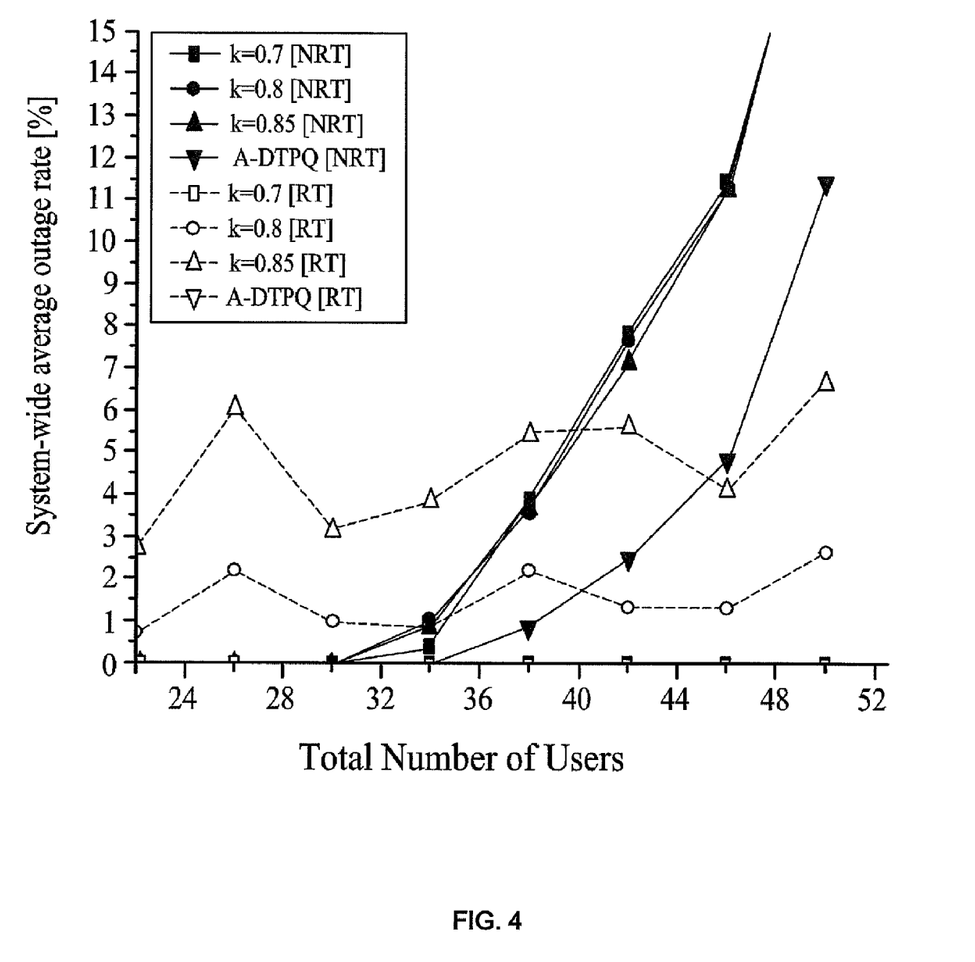
FIG. 4 is a graph illustrating a comparison of a system-wide average outage rate based on an A-DTPQ scheduling scheme according to a preferred embodiment of the present invention and a system-wide average outage rate based on a DTPQ scheduling scheme according to the prior art when the number of realtime service users is fixed to 20 and the number of non-realtime service users is increased.
Figure 5:
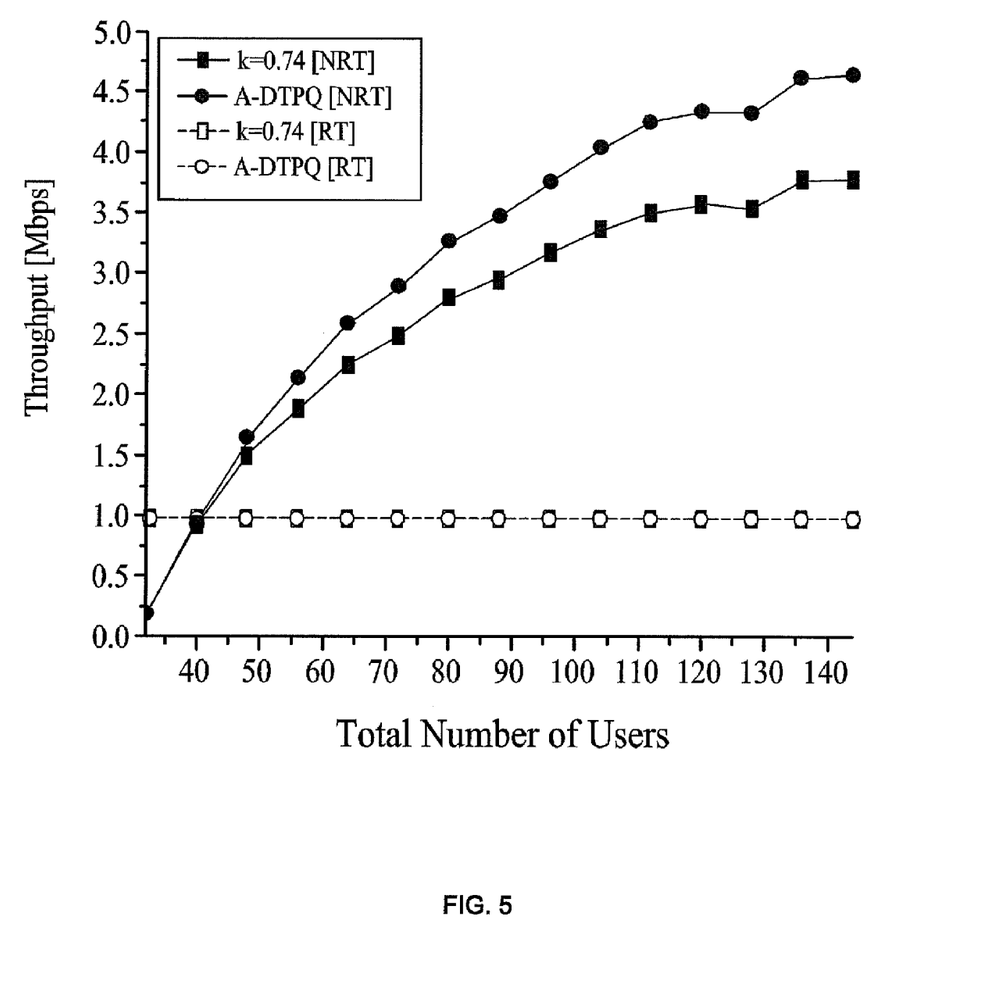
FIG. 5 is a graph illustrating a comparison of a throughput based on an A-DTPQ scheduling scheme according to a preferred embodiment of the present invention and a throughput based on a DTPQ scheduling scheme according to the prior art when the number of realtime service users is fixed to 20 and the number of non-realtime service users is increased.
Figure 6:
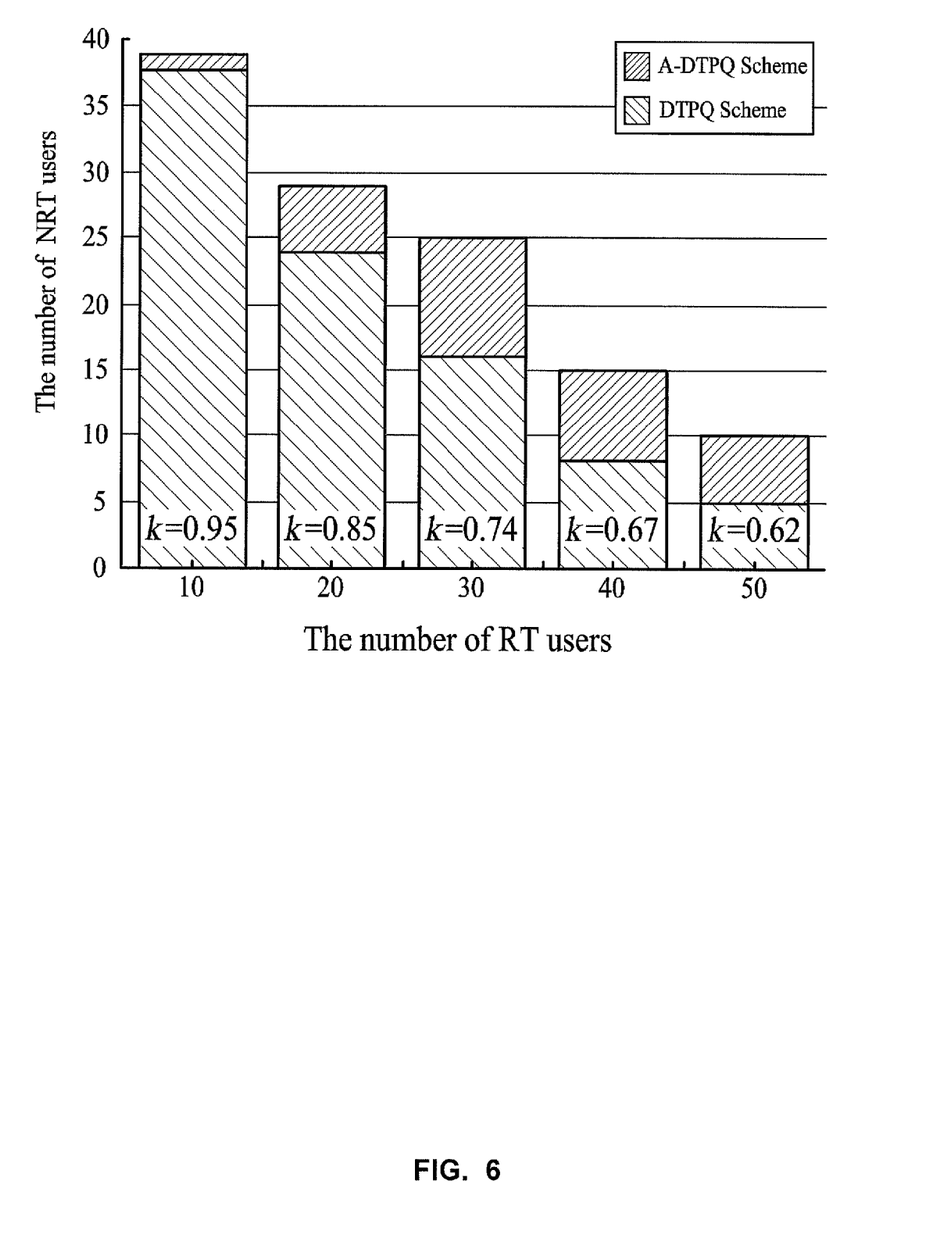
FIG. 6 is a graph illustrating a comparison of average system capacity based on an A-DTPQ scheduling scheme according to a preferred embodiment of the present invention and average system capacity based on a DTPQ scheduling scheme according to the prior art.

FIG. 3 is a graph illustrating a system-wide average outage rate based on α in the urgency metric according to a preferred embodiment of the present invention, and FIG. 4 is a graph illustrating a comparison of a system-wide average outage rate based on the A-DTPQ scheduling scheme according to the preferred embodiment of the present invention and a system-wide average outage rate based on the DTPQ scheduling scheme according to the prior art when the number of realtime service users is fixed to 20 and the number of non-realtime service users is increased. FIG. 5 is a graph illustrating a comparison of a throughput based on the A-DTPQ scheduling scheme according to the preferred embodiment of the present invention and a throughput based on the DTPQ scheduling scheme according to the prior art when the number of realtime service users is fixed to 20 and the number of non-realtime service users is increased. FIG. 6 is a graph illustrating a comparison of average system capacity based on the A-DTPQ scheduling scheme according to the preferred embodiment of the present invention and average system capacity based on the DTPQ scheduling scheme according to the prior art.

The computational experiments according to the preferred embodiment of the present invention illustrated in FIGS. 3 to 6 have considered a downlink based on the standard of a mobile access system (i.e. a portable Internet system) to be commercialized in Korea. The mobile access system used for the computational experiments of the present invention has considered an OFDMA/TDD system having a bandwidth of 9 MHz and 768 effective subcarriers. In the mobile access system, an OFDM symbol has a length of 115.2 μs, and the number of subcarriers during one symbol interval is 16. Further, one frame has a length of 5 ms, and a symbol ratio of a downlink and an uplink has an asymmetrical frame structure of 24:12. Accordingly, the number of downlink subcarriers in one frame is 384 (768 subcarriers×one subcarrier/48 subcarriers/symbol×24_symbols).

The computational experiments according to the preferred embodiment of the present invention illustrated in FIGS. 3 to 6 have performed modeling in consideration of an ideal hexagonal cell, in which a sub-cell is divided into three sectors, in order to analyze performance for a scheduling scheme proposed in multi-cell environments, and have performed the modeling in consideration of the total 19 cells including all three tiers based on a reference cell. Further, the computational experiments have considered a wrap-around structure, in which cells are interconnected in a three-dimensional space, in order to remove cell boundary point effects and reflect an interference level similar to actual situations, have considered the application of a Hata path loss model and a Log-Normal Shadow Fading model, and have considered a correlation distance in order to reflect a correlation between a terminal and a base station according to distances.

The mobile access system used for the computational experiments has calculated Signal-to-Noise Ratios (SNRs) requested by a user based on an Adaptation of Modulation & coding (AMC) mode in all frames, and has set the total power of a base station to 20 Watts. Further, all users are uniformly generated within a cell, and hard handover has been applied to users moving into another cell. It is assumed that transmission errors do not occur on a radio channel, and thus a separate Automatic Repeat reQuest (ARQ) protocol has not applied. Accordingly, the mobile access system has considered an ideal channel in which retransmission overhead does not occur due to the ARQ protocol. In addition, the performance has been measured for 3000 frames (i.e. 15 seconds) during which the computational experiments have been implemented. In the meantime, table 1 shows various variable values used for the computational experiments using the A-DTPQ scheduling algorithm according to the preferred embodiment of the present invention.

TABLE 1

| Parameter | Value | Note |
| --- | --- | --- |
| Cell layout | Hexagonal cell/3 tiers | |
| Number of sectors | 3 sectors | |
| Mobile speed | 3 km/h, 30 km/h | |
| Cell radius | 1 km | |
| Antenna patterns | $A(\theta) = -\min\left[12\left(\frac{\theta}{\theta_{3db}}\right)^2, A_m\right], -180 \leq \theta \leq 180$ | $\theta_{3dB} = 700$, $A_m = 20$ dB |
| BS Tx. Power | 20 W | |
| Path loss | $L = 137.03 + 35.225 \log_{10}d$ | d = distance to BS |
| Standard deviation for log-normal shadowing | $\sigma_s^2 = 8$ dB | |

An AMC scheme can be applied to an SNR value based on channel conditions of a user in a physical layer. Further, a channel model has used Pedestrian-A and Vehicle-A of an ITU-R M.1225, a transmission mode based on the SNR value of a user in the computational experiments of the present invention is determined by Table 2, and reception with a base station has been implemented in an AMC mode.

TABLE 2

| MCS | | Ped-A: 3 km/h | Veh-A: 30 km/h |
| --- | --- | --- | --- |
| | | Required SNB (Db) | |
| QPSK | 1/12 | −3.9 | −2.2 |
| QPSK | 1/6 | −1.7 | 0.1 |
| QPSK | 1/3 | −1.5 | 2.9 |
| QPSK | 1/2 | 4.1 | 6.0 |
| QPSK | 2/3 | 7.9 | 10.2 |
| 16-QAM | 1/2 | 9.15 | 10.9 |
| 16-QAM | 2/3 | 13.15 | 15.2 |
| 64-QAM | 1/2 | 16.1 | 20.2 |
| 64-QAM | 2/3 | 18.4 | 28.6 |

In the computational experiments of the present invention, the maximum allowable delay time of the realtime service class was set to 200 msec, and the minimum request data rate of the non-realtime service class was set to 64 kbps. In addition, the maximum allowable system-wide average outage rate according to service classes was set to 0.1 ($P_{max}^{(rt)} = P_{max}^{(nrt)}$). That is, when the mobile access system uses a video streaming service, $\Pr\{\Pr\{W_t^{hol}(t) > 0.2 \text{ sec}\} > 0.01\} < 0.1$. When the mobile access system uses a File Transfer Service (FTP), $\Pr\{R'_i < 64 \text{ kbps}\} < 0.1$. In the present invention, for the realtime service class, the computational experiments have been performed in consideration of the PF scheduling algorithm. For the non-realtime service class, the computational experiments have been performed in consideration of the maximum C/I scheduling algorithm.

In the case of a traffic model used for the computational experiments of the present invention, the traffic model of the realtime service class uses a video streaming traffic model, and the traffic model of the non-realtime service class uses an FTP model. In the case of the video streaming traffic model, a frame is transmitted to the terminal of a user at regular intervals according to a frame data rate during one video streaming session. An Inter Frame Interval (IFI) is determined by the number of frames occurring per second. Since the present invention uses the number of frames occurring per second as 10 Frame Per Second (FPS), the interval between frames arriving at the terminal of a user is 100 ms. Further, it is assumed that each frame includes a fixed number of slices, each slice generates one packet data, and an inter packet data interval and the size of each packet data conform to a Truncated Pareto distribution. Such a fact can also be understood through various parameters used for the video streaming traffic model in Table 3.

TABLE 3

| Category | Distribution | Parameters |
| --- | --- | --- |
| Slice size | Truncated Pareto | $\theta = 1.2$, $\mu_{min} = 20$ byte, $\mu_{max} = 125$ byte |
| Slice inter-arrival time | Truncated Pareto | $\theta = 1.2$, $\mu_{min} = 2.5$ ms, $\mu_{max} = 12.5$ ms |

Herein, since the traffic model of the non-realtime service class conforms to an FTP model, and ensures a data rate for packet data of a constant level, it is assumed that traffic with a constant amount is generated. In the present invention, it is assumed that a sustained bit rate is 64 kbps, and packet data of 600 bytes is generated every 10 frames as shown in Table 4.

TABLE 4

| Information types | Distribution | Parameters |
|---|---|---|
| Packet call size | Deterministic | 600 byte |
| Inter-arrival time between packet calls | Deterministic | 50 ms |

Hereinafter, FIG. 3 will be described in detail based on knowledge about the computational experiments as described above. FIG. 3 is a graph illustrating a system-wide average outage rate of the non-realtime service class based on a weight α. If α has a value of 1, only residual time is considered in the urgency metric of Equation 8. If α has a value of 0, only channel conditions are considered. As illustrated in FIG. 3, it can be understood that the performance of the mobile access system is improved when a has a value of 0.5. This implies a gain that can be obtained by simultaneously considering the residual time and channel conditions. Specifically, it can be understood that the gain obviously appears when many users exist, and α is set to have a value of 0.5 in the following analysis.

FIG. 4 is a graph illustrating a comparison of system-wide average outage rates based on the A-DTPQ scheduling scheme and the DTPQ scheduling scheme according to a delay threshold value while altering the number of non-realtime service users when the number of realtime service users is fixed to 20 (i.e. when $N_{rt}$=20). As illustrated in FIG. 4, in the case of the DTPQ scheduling scheme, it can be understood that an optimal threshold value for satisfying QoS requirements must be differently set according to changes in a user component ratio. That is, as the user component ratio changes, a delay threshold value for minimizing the system-wide average outage rates of the non-realtime service also changes. However, the A-DTPQ scheduling scheme achieves improved performance regardless of the number of users, as compared to the DTPQ scheduling scheme. That is, it can be understood that the proposed scheme adaptively sets a delay threshold value in consideration of the urgency of realtime users and channel conditions, and the efficiency of idle resources is high.

FIG. 5 is a graph illustrating a comparison of throughputs between the present invention and the prior art when $N_{rt}$ has a value of 30. In the case of the DTPQ, k is fixed to 0.74. In the case of the A-DTPQ scheduling scheme according to the preferred embodiment of the present invention, the throughput for the mobile access system is about 4.5 Mbps. In the case of the DTPQ scheduling scheme according to the prior art, the throughput for the mobile access system is about 3.64 Mbps. Consequently, the A-DTPQ scheduling scheme shows a throughput improved by about 23% (0.86=4.5−3.64) as compared to the DTPQ scheduling scheme.

FIG. 6 is a graph illustrating a comparison of average system capacities between the present invention and the prior art, which shows the maximum number of non-realtime users that can be accommodated while satisfying QoS requirements for given realtime service users according to a delay threshold value. As illustrated in FIG. 5, when $N_{rt}$ has a value of 30, user capacity has increased by about 56% (16→25) according to the A-DTPQ scheduling scheme.

While this invention has been described in connection with what is presently considered to be the most practical and preferred embodiment, it is to be understood that the present invention is not limited to the disclosed embodiment and the drawings, but, on the contrary, it is intended to cover various modifications and variations within the spirit and scope of the appended claims.

INDUSTRIAL APPLICABILITY

As described above, the present invention can improve the performance of a non-realtime service class while satisfying QoS requirements requested for each service class in a mobile access system integrally providing a realtime service and a non-realtime service. In other words, by using an A-DTPQ scheduling scheme according to a preferred embodiment of the present invention, it is possible to increase the entire capacity of a mobile access system.

The invention claimed is:

1. A method for Adaptive Delay Threshold-based Priority Queueing (A-DTPQ) scheduling by which a packet data scheduler allocates wireless resources, the packet data scheduler being included in a mobile broadband wireless access system integrally providing a realtime service and a non-realtime service, the method comprising the steps of:
   (a) determining whether there exists a terminal receiving packet data in excess of a delay threshold value by analyzing packet data transmitted to a plurality of user terminals requesting use of the realtime service;
   (b) calculating an urgency metric for determining whether urgency of terminals of realtime users utilizing the mobile broadband wireless access system has been reached when step (a) determines that the terminal receiving packet data is in excess of the delay threshold value, with the urgency metric calculated using at least a residual time and an instantaneous data rate of the packet data transmitted to the terminal exceeding the delay threshold value;
   (c) adaptively updating the delay threshold value based on the calculated urgency metric in step (b); and
   (d) allocating the wireless resources to the terminal according to the delay threshold value updated in step (c).

2. The method as claimed in claim 1, wherein, in step (a), when there exists a terminal exceeding the delay threshold value from among the user terminals as a result of analyzing a Head of Line (HOL) of the packet data transmitted to the user terminals, the terminal is set as a delay threshold value-exceeding terminal, step (a) comprises the sub-steps of:
   (a1) computing a delay threshold value control parameter $k_t$ by analyzing the HOL of the packet data;
   (a2) computing a maximum allowable delay time $W_{max}$, for which the packet data is allowed to be transmitted to the user terminal, by analyzing the HOL of the packet data;
   (a3) computing delay threshold value $k_t W_{max}$ by multiplying the delay threshold value control parameter by the maximum allowable delay time; and
   (a4) setting the user terminal as an urgent user terminal by using the delay threshold value $k_t W_{max}$ computed in step (a3).

3. The method as claimed in claim 1, wherein the urgency metric is computed by the equation $$c(t) = \alpha \sum_{i=1}^{Y_{rt}(K_t)} \max(W_{max} - W_i^{hol}(t), 0) + (1 - \alpha) \sum_{i=1}^{Y_{rt}(K_t)} r_i(t),$$

wherein $W_{max}$ denotes the maximum allowable delay time, $W_i^{hol}(t)$ denotes the delay time of a Head of line (HOL)

for a user i, α denotes a weighting factor for determining A weight between the urgency of urgent realtime users and a weight among channel conditions, and the second term $$\sum_{i=1}^{Y_{rt}(K_t)} r_i(t)$$

of the equation denotes an average data rate of urgent realtime service users in frame t Wherein $r_i(t)$ means current data rate of user i.

4. The method as claimed in claim 1, wherein the urgency metric is computed in each frame of packet data transmitted to the terminal exceeding the delay threshold value, a delay threshold value-exceeding terminal, the computed urgency metrics are compared, and the delay threshold value is adaptively altered and updated, so that the wireless resources are efficiently allocated, and step (d) further comprises the substeps of:

(d1) increasing allocation of the wireless resources to a terminal requesting use of the non-realtime service by increasing the delay threshold value when the urgency metric is an incremental type; and (d2) decreasing allocation of the wireless resources to the terminal requesting the use of the realtime service by decreasing the delay threshold value when the urgency metric is a decremental type.

5. A method for computing an urgency metric in an Adaptive Delay Threshold-based Priority Queueing (A-DTPQ) scheduling method in which a packet data scheduler allocates the wireless resources, the packet data scheduler being included in a mobile broadband wireless access system integrally providing a realtime service and a non-realtime service, the method comprising the steps of:

(a) computing residual time $W_{max}-W_i^{hol}(t)$ by analyzing a Head of Line (HOL) of packet data transmitted to a plurality of user terminals requesting use of the realtime service wherein $W_{max}$ denotes the maximum allowable delay time, $W_i^{hol}(t)$ denotes the delay time of a Head of line (HOL) for a user i;

(b) computing an instantaneous data rate $r_i(t)$, wherein $r_i(t)$ means current data rate of user i by analyzing the HOL of the packet data;

(c) computing a delay loss rate $z_t$ by analyzing the HOL of the packet data; and (d) computing the urgency metric by using the residual time $W_{max}-W_i^{hol}(t)$ computed in step (a), the instantaneous data rate $r_i(t)$ computed in step (b), and the delay loss rate $z_t$ computed in step (c), wherein the urgency metric is a criterion for determining whether urgency of terminals of realtime users utilizing the mobile broadband wireless access system has been reached.

6. The method as claimed in claim 5, wherein the urgency metric is computed by an equation $$c(t) = \alpha \sum_{i=1}^{Y_{rt}(K_t)} \max(W_{max} - W_i^{hol}(t), 0) + (1-\alpha) \sum_{i=1}^{Y_{rt}(K_t)} r_i(t)$$

wherein α denotes a weighting factor for determining a weight between the urgency of urgent realtime users and a weight among channel condition.

7. The method as claimed in claim 5, further comprising step (e) of increasing the urgency metric and a delay threshold value $k_t W_{max}$ when there exists a terminal urgently requesting the realtime service among user terminals, requesting the realtime service, the residual time $W_{max}-W_i^{hol}(t)$ increases for packet data transmitted to the terminal, the instantaneous data rate $r_i(t)$ increases, and the delay loss rate $Z_t$ is smaller than a threshold delay loss rate $Z_{max}$.

8. The method as claimed in claim 7, further comprising step (f) of maintaining the delay threshold value $k_t W_{max}$, when the urgency metric is a decremental type, if there exists a terminal urgently requesting the realtime service among the user terminals, requesting the realtime service, the residual time $W_{max}-W_i^{hol}(t)$ increases for packet data transmitted to the terminal, the instantaneous data rate $r_i(t)$ increases, and the delay loss rate $Z_t$ is smaller than the threshold delay loss rate $Z_{max}$.

9. The method as claimed in claim 8, further comprising step (g) of decreasing the urgency metric and exponentially decreasing delay threshold value $k_t W_{max}$ when there exists a terminal urgently requesting the realtime service among the user terminals, requesting the realtime service, the residual time $W_{max}-W_i^{hol}(t)$ increases for packet data transmitted to the terminal, the instantaneous data rate $r_i(t)$ increases, and the delay loss rate $Z_t$ is greater than a threshold delay loss rate $Z_{max}$.

* * * * *